US012016264B2

(12) United States Patent
Harmon et al.

(10) Patent No.: US 12,016,264 B2
(45) Date of Patent: Jun. 25, 2024

(54) MEASUREMENT OF SEEDER CART TANK CONTENTS

(71) Applicant: Deere & Company, Moline, IL (US)

(72) Inventors: Andrew W. Harmon, Davenport, IA (US); Jacob G. Schoeny, Bettendorf, IA (US); William D. Graham, East Moline, IL (US); Anant Dnyanoba Nimbalkar, Pune (IN); Vikas V. Kshirsagar, Pune (IN); Vinit Jawale, Pune (IN); Anand Raj, Pune (IN); Nilkanth Devshetwar, Pune (IN)

(73) Assignee: Deere & Company, Moline, IL (US)

( * ) Notice: Subject to any disclaimer, the term of this patent is extended or adjusted under 35 U.S.C. 154(b) by 305 days.

(21) Appl. No.: 17/224,412

(22) Filed: Apr. 7, 2021

(65) Prior Publication Data
US 2022/0000013 A1 Jan. 6, 2022

(30) Foreign Application Priority Data

Jul. 3, 2020 (IN) .............................. 202021028378

(51) Int. Cl.
*A01C 7/08* (2006.01)
*A01C 7/20* (2006.01)
*G01F 22/00* (2006.01)
*G01F 23/296* (2022.01)

(52) U.S. Cl.
CPC ................ *A01C 7/20* (2013.01); *A01C 7/084* (2013.01); *G01F 22/00* (2013.01); *G01F 23/296* (2013.01)

(58) Field of Classification Search
None
See application file for complete search history.

(56) References Cited

U.S. PATENT DOCUMENTS

| 5,927,217 | A | * | 7/1999 | Halford | A01C 7/081 |
| | | | | | 111/174 |
| 7,877,181 | B2 | * | 1/2011 | Chervenka | A01D 41/1275 |
| | | | | | 460/119 |
| 8,695,396 | B2 | * | 4/2014 | Landphair | A01C 7/107 |
| | | | | | 73/1.16 |
| 9,779,330 | B2 | * | 10/2017 | Wellington | G06T 7/12 |
| 9,829,364 | B2 | * | 11/2017 | Wilson | A01D 41/00 |
| 9,903,979 | B2 | * | 2/2018 | Dybro | G01V 99/00 |

(Continued)

FOREIGN PATENT DOCUMENTS

| AU | 2019201429 A1 | 3/2019 |
| CA | 3018242 A1 | 3/2019 |

(Continued)

OTHER PUBLICATIONS

Extended European Search Report and Written Opinion issued in European Patent Application No. 21180822.5, dated Nov. 24, 2021, in 8 pages.

(Continued)

*Primary Examiner* — Joseph A Dillon, Jr.
(74) *Attorney, Agent, or Firm* — Kelly, Holt & Christenson; Joseph R. Kelly

(57) ABSTRACT

A sensor generates an output signal indicative of an attribute of a limited amount of material above the sensor. A controller receives the output signal and incorporates a corresponding variable into a programmatic calculation of an indication of a volume of material in a tank.

7 Claims, 12 Drawing Sheets

(56) References Cited

U.S. PATENT DOCUMENTS

| | | | |
|---|---|---|---|
| 10,126,282 B2* | 11/2018 | Anderson | A01D 41/1271 |
| 10,188,037 B2* | 1/2019 | Bruns | A01D 41/1273 |
| 10,295,703 B2* | 5/2019 | Dybro | G01B 21/22 |
| 10,300,898 B2 | 5/2019 | Kale et al. | |
| 10,842,085 B2* | 11/2020 | Millar | G01F 23/80 |
| 10,921,171 B2* | 2/2021 | Kremmer | A01C 15/006 |
| 11,009,395 B2* | 5/2021 | Schade | G01J 3/0232 |
| 11,428,567 B2* | 8/2022 | Kremmer | A01C 7/082 |
| 2012/0200697 A1 | 8/2012 | Wuestefeld et al. | |
| 2014/0076047 A1* | 3/2014 | Liu | A01C 15/006 |
| | | | 73/32 R |
| 2016/0109277 A1* | 4/2016 | Hunt | G01S 7/003 |
| | | | 356/5.01 |
| 2016/0120107 A1 | 5/2016 | Chahley et al. | |
| 2018/0035603 A1* | 2/2018 | Kremmer | A01C 7/20 |
| 2018/0359936 A1* | 12/2018 | Millar | G01F 23/80 |
| 2019/0049286 A1 | 2/2019 | Kron et al. | |
| 2019/0107425 A1 | 4/2019 | Welle et al. | |
| 2019/0107428 A1 | 4/2019 | Vogt et al. | |
| 2019/0183037 A1 | 6/2019 | Czapka et al. | |
| 2019/0230848 A1* | 8/2019 | Forrest | A01C 7/105 |
| 2021/0140810 A1* | 5/2021 | Kremmer | A01C 7/20 |
| 2022/0248593 A1* | 8/2022 | Ryder | A01C 7/082 |
| 2023/0039311 A1* | 2/2023 | Thompson | A01C 7/105 |

FOREIGN PATENT DOCUMENTS

| | | |
|---|---|---|
| CN | 207284160 U | 5/2018 |
| DE | 8805329 U1 | 6/1988 |
| DE | 102017116455 A1 | 1/2019 |
| EP | 0307042 A1 * | 3/1989 |
| EP | 2708859 A1 | 3/2014 |
| EP | 2417846 A1 | 2/2021 |
| HU | E040669 T2 | 3/2019 |
| WO | 2019013369 A1 | 1/2019 |
| WO | 2019053303 A1 | 3/2019 |

OTHER PUBLICATIONS

BOURGAULTPast Performers: Retrieved from the Internet on Feb. 6, 2024, 7 pages. <https://www.bourgault.com/product/en-US/7000-series-features-options/654/weigh-scales.aspx>.

* cited by examiner

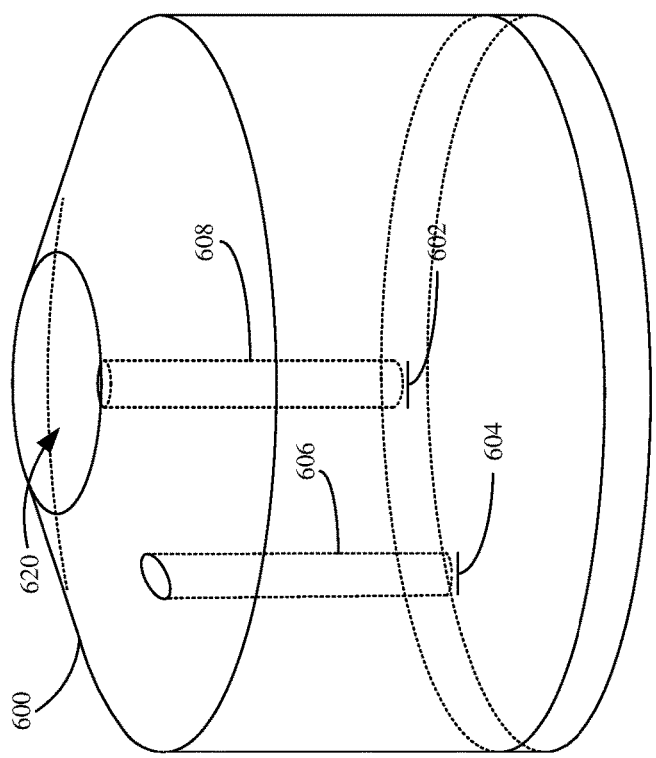
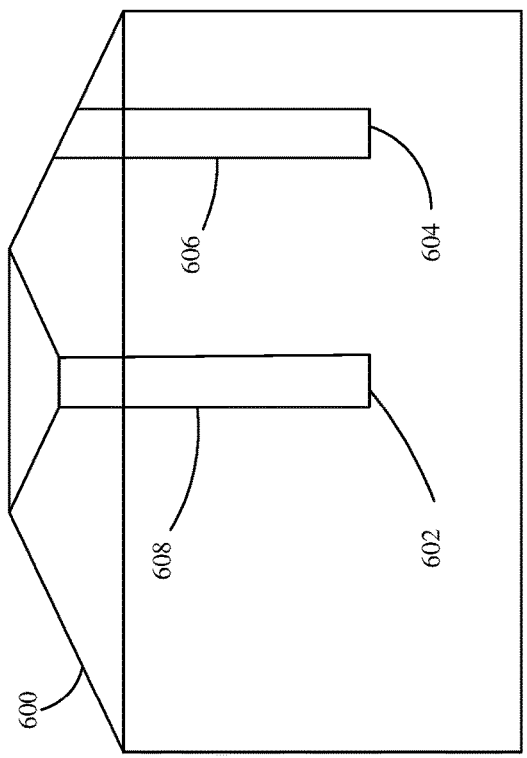
FIG. 6A
FIG. 6B

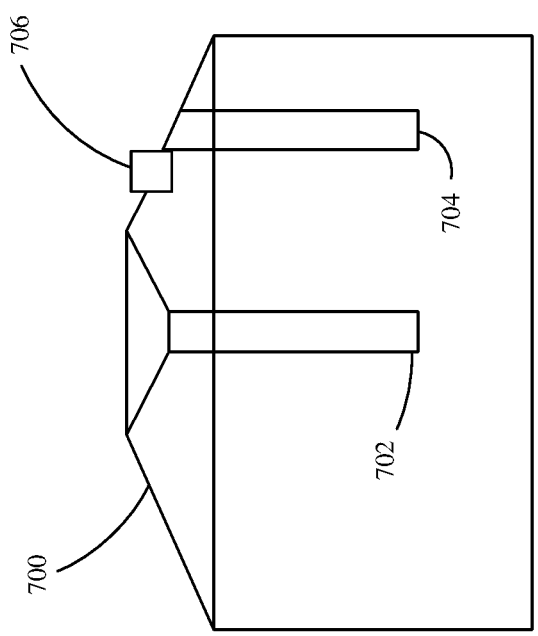
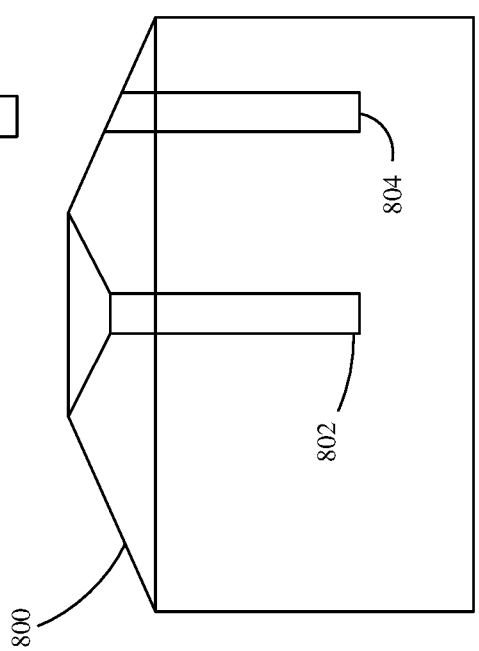

MEASUREMENT OF SEEDER CART TANK CONTENTS

CROSS-REFERENCE TO RELATED APPLICATION

The present application claims priority to Indian patent application Serial No. 202021028378, filed Jul. 3, 2020, the content of which is hereby incorporated by reference in its entirety.

FIELD OF THE DESCRIPTION

This disclosure relates to measurement of a material in a container and is particularly useful in the context of measurement of commodities or other materials stored in a tank portion of an air seeder commodity cart.

BACKGROUND

When distributing material from a container, it is often beneficial to have information about the quantity of material in the container. One context in which this scenario arises is that of an agricultural seeder. It is important in this case to know when seed or other material being hauled in a storage tank is about to be exhausted at least so that the tank may be resupplied in a timely manner. A fill level indicator is sometimes deployed and typically utilizes a simple set of level sensors (e.g., paddle bin sensors) dispersed at a few different heights within the tank. But this type of indicator is limited to providing a not particularly exact indication of the current quantity of material in a tank. For example, this is often an indication of whether the tank is one-quarter full, half full, or three quarters full. To the extent that a more precise indicator is provided, it would typically be a rough estimate. While this type of tank fill feedback is certainly useful, having just this category of level information is of limited value. It would be useful for a broader range of purposes to acquire more specific knowledge of the actual quantity of material in the tank, especially on a continuous basis. For example, knowing more precisely the quantity of material in the tank can be useful in automatic meter calibration that may otherwise require stopping the machine. More detailed information also enables possibly more useful indicators such as a number of planting acres to empty, etc. Such information can also be utilized to improve the accuracy of a quantity of seeds being planted, for example in terms of pounds or seeds per acre, etc. These are but examples of why more detailed information is generally better and enables more advantageous features and functionality.

Attempts have been made to gather more detailed information. For example, a series of load cells has been configured to support a tank in a manner that enables an overall weight of the tank and the material in the tank to be measured, even somewhat continuously. But such load cell arrangements are generally an expensive, especially when a separate arrangement is deployed for each tank. Further, the ability to accurately weigh tank contents in this arrangement generally requires that each tank be isolated from all neighboring elements, such as other tanks. The material composition of the walls of tanks is such that balancing the tank on the load cells creates a series of high stress points that can, over time, cause expansion or bloating. This can cause neighboring tanks or other components to undesirably come into contact with one another, thereby throwing off measurements taken by the load cells. It is also worth mentioning that it is undesirable to increase the gaps between elements at least for aesthetic reasons but also because it causes an inefficient usage of space.

The discussion above is merely provided for general background information and is not intended to be used as an aid in determining the scope of the claimed subject matter.

SUMMARY

A sensor generates an output signal indicative of an attribute of a limited amount of material above the sensor. A controller receives the output signal and incorporates a corresponding variable into a programmatic calculation of an indication of a volume of material in a tank.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 6A is a schematic perspective view of material inside another hypothetical tank.

FIG. 6B is a schematic side view of the material shown in FIG. 6A.

FIG. 7 is a schematic side view of material inside another hypothetical tank.

FIG. 8 is a schematic side view of material inside another hypothetical tank.

DETAILED DESCRIPTION

Figure 1:
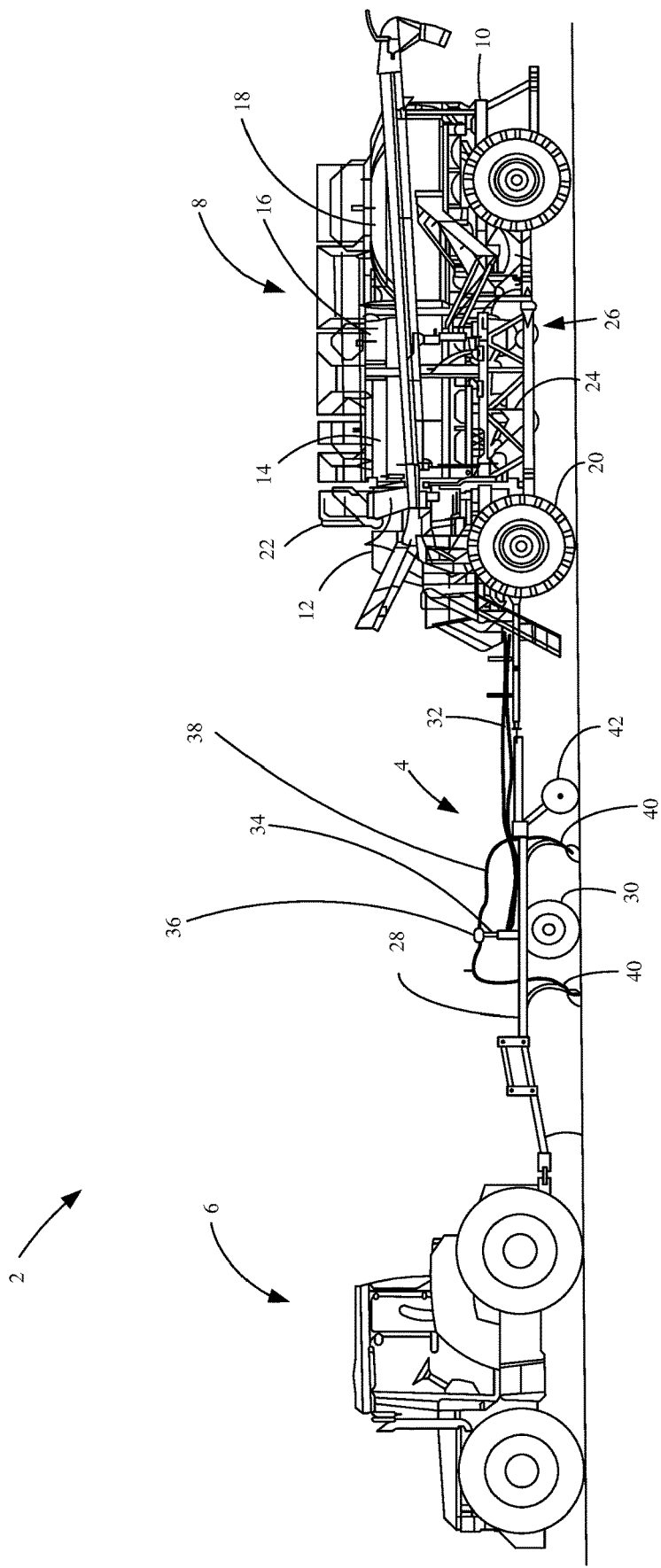
FIG. 1 is a side view of an example of an agricultural implement.

FIG. 1 is a side view of an example of an agricultural implement, in particular an air or pneumatic seeder 2. The seeder 2 comprises a tilling implement 4 (also sometimes called a drill) towed between a tractor 6 and a commodity cart 8 (also sometimes called an air cart). The commodity cart 8 has a frame 10 upon which a series of product tanks 12, 14, 16, 18, and wheels 20 (a representative one of which is labeled) are mounted. Each product tank has a door 22 (a representative one of which is labeled) releasably sealing an opening at its upper end for filling the tank with product, most usually a commodity of one type or another. A metering system 24 is provided at a lower end of each tank (a representative one of which is labeled) for controlled feeding or draining of product (most typically granular material) into a pneumatic distribution system 26. The tanks 12, 14, 16 and 18 can be any suitable device for holding a material or commodity such as seed or fertilizer to be distributed to the soil. The tanks can be hoppers, bins, boxes, containers, etc. The term "tank" shall be broadly construed herein. Furthermore, one tank with multiple compartments can also be provided instead of separated tanks. The tanks can be constructed of any material or materials, one example being a plastic material.

The tilling implement 4 includes a frame 28 supported by ground wheels 30 and is connected to a leading portion of the commodity cart 8, for example by a tongue style attachment (not labeled). The commodity cart 8 as shown is sometimes called a "tow behind cart," meaning that the cart follows the tilling implement 4. In an alternative arrangement, the cart can be configured as a "tow between cart," meaning the cart is between the tractor 6 and tilling implement 4. In yet a further possible arrangement, the commodity cart 8 and tilling implement 4 can be combined to form a unified rather than separated configuration. These are just examples of additional possible configurations. Other configurations are even possible and all configurations should be considered contemplated and within the scope of the present description.

The pneumatic distribution system 26 includes a fan (not shown) connected to a product delivery conduit structure having multiple product flow passages 32. The fan directs air through the flow passages 32. Each product metering system 24 controls delivery of product from its associated tank at a controllable rate to the transporting airstreams moving through flow passages 32. In this manner, each flow passage 32 carries product from the tanks to a secondary distribution tower 34 on the tilling implement 4. Typically, there will be one tower 34 for each flow passage 32. Each tower 34 includes a secondary distributing manifold 36, typically located at the top of a vertical tube. The distributing manifold 36 divides the flow of product into a number of secondary distribution lines 38. Each secondary distribution line 38 delivers product to one of a plurality of ground engaging tools 40 (also known as ground openers) that open a furrow in the soil and facilitates deposit of the product therein. The number of flow passages 32 that feed into secondary distribution may vary from one to eight or ten or more, depending at least upon the configuration of the commodity cart 8 and tilling implement 4. Depending upon the cart and implement, there may be two distribution manifolds 36 in the air stream between the meters 24 and the ground engaging tools 40. Alternatively, in some configurations, the product is metered directly from the tank or tanks into secondary distribution lines that the ground engaging tools 40 without any need for an intermediate distribution manifold. The configurations described herein are only examples. Other configurations are possible and should be considered contemplated and within the scope of the present description.

A firming or closing wheel 42 associated with each ground engaging tool 40 trails the tool and firms the soil over the product deposited in the soil. In practice, a variety of different types of tools 40 are used including, but not necessarily limited to, tines, shanks and disks. The tools 40 are typically movable between a lowered position engaging the ground and a raised position riding above the ground. Each individual tool 40 may be configured to be raised by a separate actuator. Alternatively, multiple tools 40 may be mounted to a common component for movement together. In yet another alternative, the tools 40 may be fixed to the frame 28, the frame being configured to be raised and lowered with the tools 40.

Examples of air or pneumatic seeder 2 described above should not be considered limiting. The features described in the present description can be applied to any seeder configuration, whether specifically described herein or not.

Figure 2:
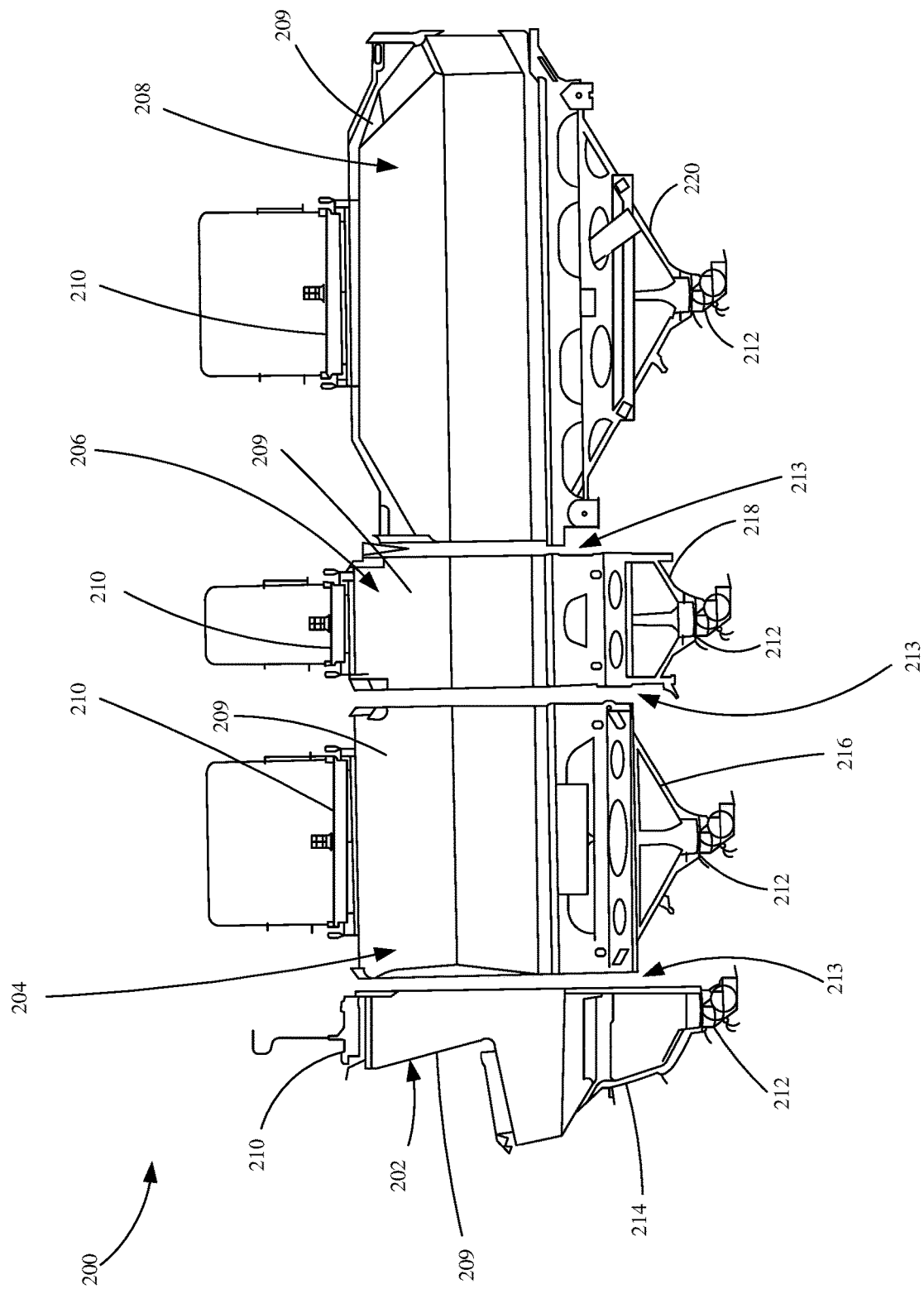
FIG. 2 is a side view of an example set of tanks.

FIG. 2 is a side view of an example set of tanks 200, which includes individual tanks 202, 204, 206, and 208. Tanks 200 are a more detailed representation of what the tanks 12, 14, 16 and 18 described in relation to FIG. 1 might look like. Similar to the tanks shown FIG. 1, tanks 202, 204, 206 and 208 each include a door 210 releasably sealing an opening at its upper end for filling the tank with product, most usually a commodity of one type or another. Tanks 200 also each include a metering system 212 provided at a lower end of each tank for controlled feeding of product (most typically granular material) into a pneumatic or other distribution system.

A spacing gap 213 is illustratively maintained where tanks 202, 204, 206, and 208 are adjacent to one another when they are placed into a functional position on a commodity cart (not shown in FIG. 2). From the perspective of at least some individuals, spacing gaps 213 are not aesthetically pleasing. At the very least, they are not a particularly efficient use of space on the commodity cart. However, the gaps 213 help to avoid tank-to-tank contact, which for some applications could be a requirement. Such contact is a possibility because the holding chamber portion 209 of each tank is often fabricated of a plastic type or other potentially expandable material. After repetitive use over time, especially when chamber portion 209 is frequently pressurized, the material sometimes expands and even deforms. With that in mind, the tanks 202, 204, 206, and 208 are each provided with a supporting structure 214, 216, 218, and 220, respectively. These supporting structures, which add complexity and cost to the overall tank design, are each configured to encourage the gap 213, even if chamber portions 209 expand or become deformed.

In some implementations, the weight of each of tanks 202, 204, 206 and 208 and some (or none or all) of the weight of supporting structures 214, 216, 218, and 220 is balanced across one or more load cells (not shown inf FIG. 2). These load cells are part of a measurement system that collects data that is in one way or another indicative of a quantity of content in each tank. Concentrated stress on tanks 200 sometimes occurs around where the load cells come into contact with the tank or associated supporting structure. This concentrated stress sometimes makes tanks 202, 204, 206, and 208 even more likely to expand and deform and therefore increases the risk of tanks coming into contact with one another. Neighboring tanks touching one another is generally undesirable at least because it has the potential to throw off the accuracy of weight measurements taken by one or more of the load cells.

Figure 3A:
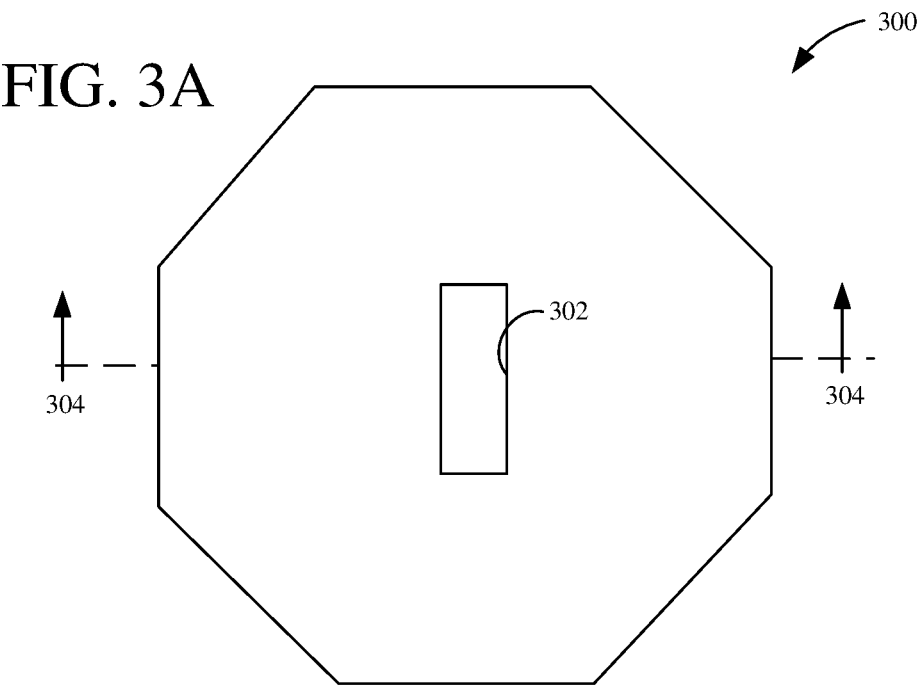
FIG. 3A is a top view of a tank.

FIG. 3A is a top view of a tank 300, which is illustratively at least similar to tank 208 described in relation to FIG. 2. An opening 302 provides access to the interior volume of tank 300. It is through opening 302 that tank 300 is likely to be refilled with material to be subsequently dispersed in a field. Tank 300 is shown without any door for releasably sealing or otherwise closing opening 302. In actual application, a door similar to door 210 described in relation to FIG. 2 would be included to releasably seal or otherwise close opening 302.

Figure 3B:
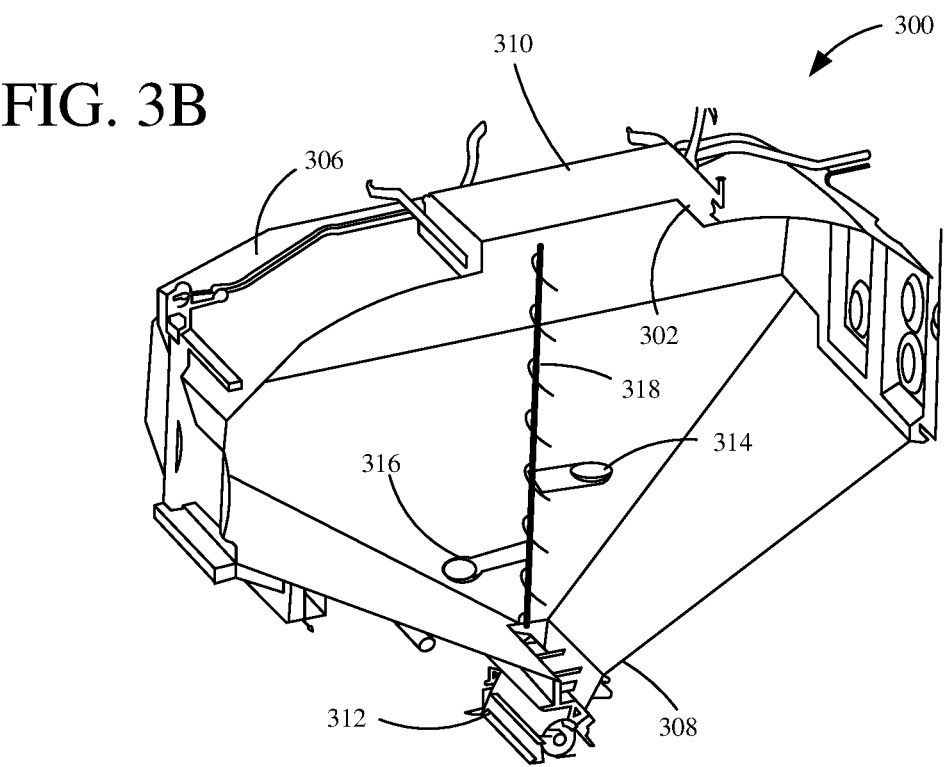
FIG. 3B is a perspective cross sectional view of the tank of FIG. 3A

FIG. 3B is a perspective cross sectional view of tank 300 essentially taken along line 304 in FIG. 3A. In this view, a door structure 310 for releasably sealing opening 302 is included at an upper end 306 of tank 300. Further, a metering system 312 is shown at a lower end 308 of tank 300. Similar to the metering system 212 described in relation to FIG. 2, metering system 312 enables a controlled feeding of product from tank 300 into a pneumatic distribution system (not shown).

Unlike any other tank described to this point, tank 300 includes sensors 314 and 316 attached to a ladder 318 (see FIG. 3B). Each of sensors 314 and 316 is illustratively but not necessarily a lily pad scale. In one example, not by limitation, the sensor is essentially a flat plate attached to a load cell type sensor. Regardless of the precise configuration, each of sensors 314 and 316 is illustratively configured to sense, and output indications of, the downward force of the weight of material (e.g., commodity material loaded for distribution) generally located above the sensor. Sensors other than lily pad scales could just as easily be utilized instead in a similar functional configuration to measure tank material from within the material itself. Nor is it critical that a sensor be mounted on a ladder such as ladder 318. Other mounting configurations, such as mounting to a sidewall of the inside of tank 300, are contemplated and should be considered within the scope of the present description. It should be noted that there could just as easily be only one or more than two sensors mounted inside tank 300.

Figure 4:
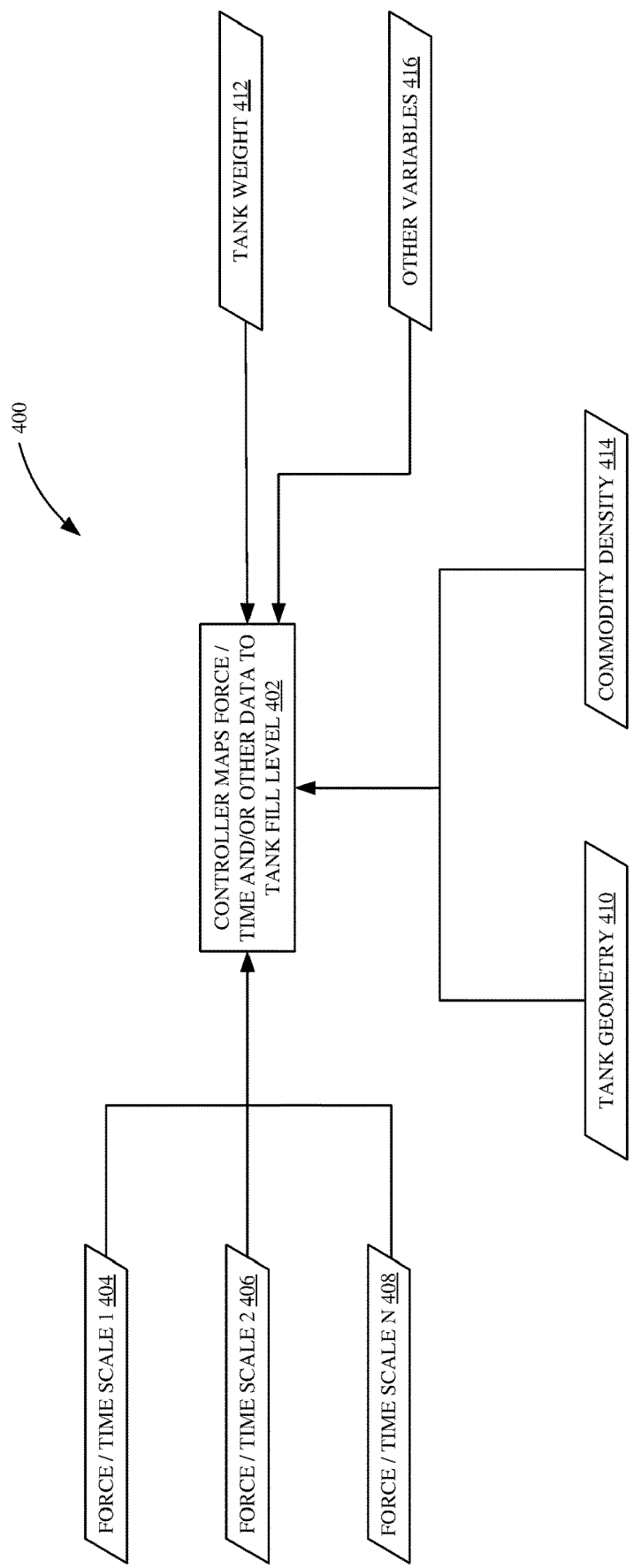
FIG. 4 is a schematic diagram demonstrating functionality of a computer controller.

FIG. 4 is a schematic diagram demonstrating functionality of a computer controller 402. Controller 402 is illustratively configured to receive one or more data inputs and utilize them as a basis for calculating a fill level for a tank, for example, an indication of how much materials remains within the interior of tank 300. As is indicated by output signal blocks 404, 406 and 408 one category of input to the calculation by controller 402 of the fill level is data received as input signals from sensors 314, 316 and any other similar sensors deployed with tank 300. Again, the number of sensors may vary from one, two, or more than two. Regardless of the number of sensors deployed within a given tank, FIG. 4 makes it clear that more than a single reading is taken from each individual sensor. Instead, measurements are illustratively taken at different points in time such that controller 402 is able to optionally execute a program as part of its calculation of tank fill that models a change in detected force or weight over a period of time. Thus, data from the sensors inside of tank 300 are illustratively one category of input to controller 402.

As is indicated by block 410, details related to the interior shape or geometry of tank 300 are optionally another variable calculated into the logic of controller 402 in its determination of tank fill level. Another variable optionally included in the logic, as is indicated by block 414, is the density of the material being stored in tank 300. As is indicated by block 412, the weight of tank 300 and/or its related components is another optional variable included by controller 402 in the calculation. In accordance with block 416, other variables not specifically mentioned herein may also or alternatively be included in the controller 402 logic. As will become more apparent, the precise combination of variables incorporated into the controller 402 calculation tank fill level will vary, even vary from one tank to another. The precise variables and combination of variables described herein should be considered only examples of how tank fill level is computed.

Figure 5:
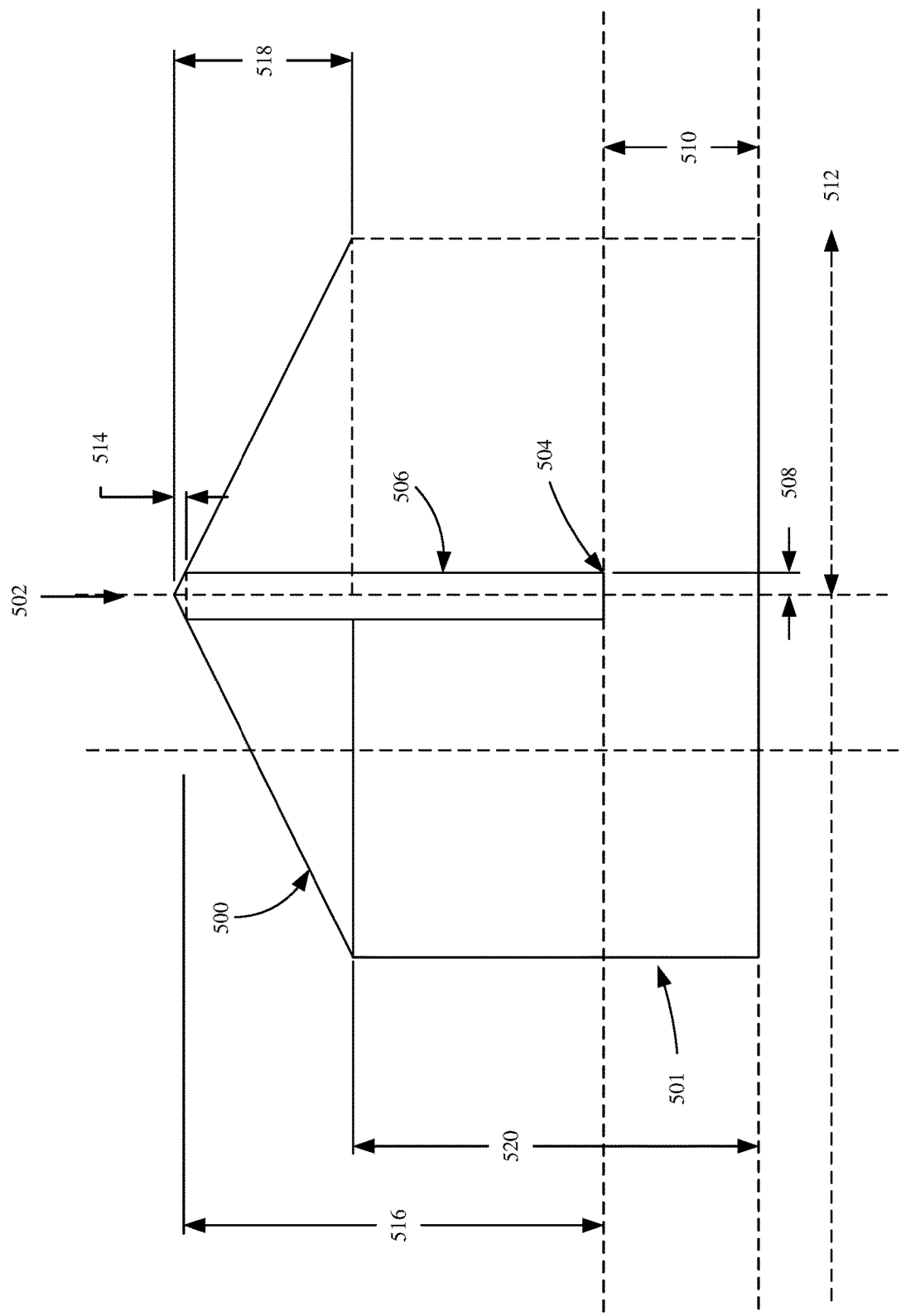
FIG. 5 is a schematic side view diagram of material inside a hypothetical tank.

FIG. 5 is a schematic side view diagram of material 500 inside of a hypothetical tank. The tank itself has been removed from the Figure in order to enable a conceptualization of an example overall shape assumed by the material inside of the tank. The intended purpose of FIG. 5 is to demonstrate a range of different possible variables for modeling tank fill. Some or all of these variables, for example, are programmed into the logic of controller 402 to support its calculations of tank fill. The tank associated with FIG. 5, as can be reasonably assumed from the illustrated overall shape of material 500 inside of it, is substantially cylindrical. It is also assumed for illustratively purposes that material is added to the tank from a substantially centered fill point that follows arrow 502. It is assumed for illustrative purposes that the overall geometry of the tank is also such that material 500 will tend toward a pointed mountain, as is reflected in FIG. 5.

It is worth noting that many seed cart tanks will have a geometry that is more complex than the example shown reflected in FIG. 5 and elsewhere in the present description. In practice, data points similar to those described herein can be collected for any specific tank implementation. For that matter, all variables discussed herein or otherwise can be modified to suite the details of a specific implementation in terms of the programmatic tank fill calculation logic into which they are incorporated. The implementations and details described herein are conceptual in nature and intended only to serve as examples. It is understood that the actual details will vary in practice from one implementation to the next.

Turning back to FIG. 5, it is illustratively assumed that the programmatic tank fill calculation logic accounts for information received from a sensor located inside the tank and within the actual material being measured. That sensor is illustratively (though not necessarily) a lily pad scale placed within material 500 in an area 504 so as to be positioned to determine downforce and other characteristics of the material generally located within an adjacent hypothetical column 506. The data for material in column 506 is recorded by the sensor and provided to controller 402 as a variable available for incorporation into tank fill calculations. In one example, the downforce measured by the sensor in the context of FIG. 5 is 415.9444 N. In another example, the mass calculated in relation to the material above the sensor is 42.4 kg.

The data made available to controller 402 for incorporation into tank fill calculations is illustratively not limited to measurements taken by the sensor. Another optional value made available to support the calculations is a radius 508 of the sensor surface that defines column 506. In one example, this radius is 100 mm. Another optional value made available to support the calculations is an indication of the sensor surface area. In one example, this is 31415.9265 mm2. Another optional value made available to support the calculations is a height 510 from the sensor to a bottom plane of the tank. In one example, this height is 600 mm. Another optional value made available to support the calculations is a radius 512 (and/or diameter) of the tank. In one example, this radius is 1500 mm (the diameter therefore being 3000 mm. Another optional value made available to support the calculations is the type of material in the tank. In one example, the material is wheat. Additional optional values made available to support the calculations include attributes of the material itself such as, but not limited to, a density of material in the tank. In one example, the material is wheat having a predetermined assumed density of 50.5 lbs./ft3 and 8.0901E-07 kg/mm3. Another optional value made available to support the calculations is an angle of repose relevant to the material in the tank. In one example, this is 25 degrees. Another optional value made available to support the calculations is gravity, which is 9.81 m/s2. Another optional value made available to support the calculations is an assumed volume of some or all material positioned above the sensor and causing the sensed data points. In one example, this is 52409735.4 mm3. Another optional value made available to support the calculations is a height 514 of an upper cone portion of material above the sensor. In one example, this is 46.6307658 mm. Another optional value made available to support the calculations is a volume of material within the upper cone portion of material above the sensor. In one example, this is 488316.238 mm3. Another optional value made available to support the calculations is a height 516 of the imaginary cylinder area excluding the upper cone portion. In one example, this is 1653.369234 mm. Another optional value made available to support the calculations is a total height of the imaginary cylinder area including the upper code portion. Another optional value made available to support the calculations is a tank cone height 518. In one example, this is 699.461487 mm. Another option value made available to support the calculations is a volume of this tank cone. In one example, this is 1648067302 mm3. Another optional value made available to support the calculations is a height from the sensor 504 to wherein the tank cone starts. In one example, this is 999.87938 mm. Another optional value made available to support the calculations is a height 520 of the tank cylinder. In one example, this is 1599.87938 mm. Another optional value made available to support the calculations is a tank cylinder area. In on example, this is 7068583.47 mm2. Another optional value made available to support the calculations is a total tank volume. In one example, this is 1.2957 mm3. One final illustrative optional value provided to support the calculations is a tank mass. In one example, this is 10482.3007 kg.

It is to be understood that all specific variables provided herein are optional and provided as examples only. Other variables are possible and should be considered within the scope of the overall concept. Further, some of the variables can be more consistent with estimation rather than precise measurement. The level of precision will depend upon, among other factors, whether the value was directly measured, how it was measured, whether it was instead a derived calculation, etc. The precision may vary from application to application but the overall purpose of the concept remains valid regardless. Further, the complexity of a given implementation is likely to vary depending upon context. Some implementations may include multiple sensors or even multiple types of sensors all contributing data to the tank fill calculation logic with which the controller is programmed.

Figure 6C:
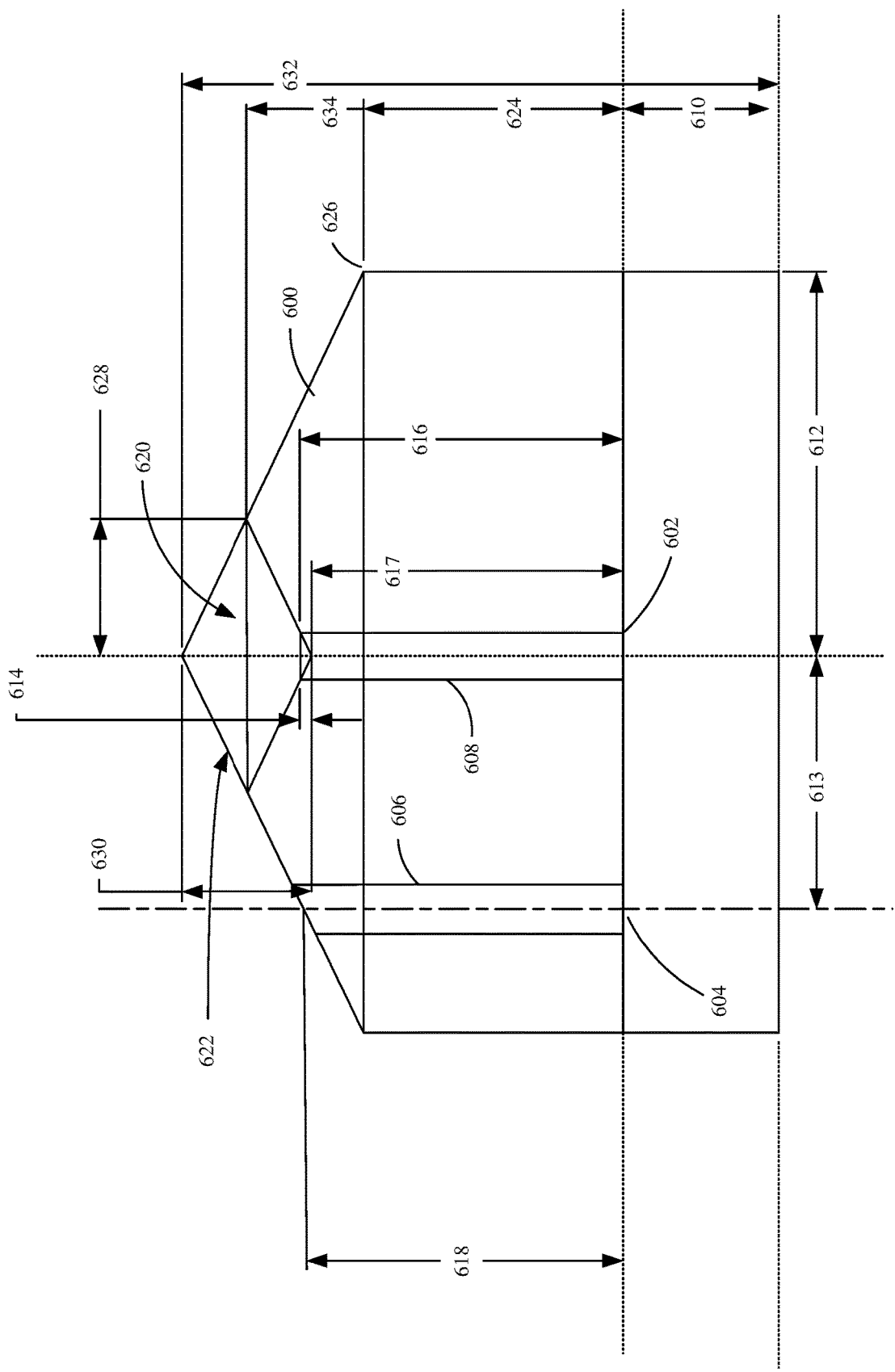
FIG. 6C is an annotated version of the FIG. 6B

FIGS. 6A-6C provide another, slightly more complex example. FIG. 6A is a schematic perspective view of material 600 inside of a hypothetical tank. FIG. 6B is a schematic side view of the same material 600. Finally, FIG. 6C is another version of the view shown in FIG. 6B but this time annotated with possible variables for tank programmatic tank fill calculations. Some or all of the variables that will be pointed out, for example, are programmed into the logic of controller 402 to support its calculations of tank fill.

The tank itself has again been removed from FIGS.6A-6C in order to enable another conceptualization of an example of an overall shape assumed by material inside of the tank. The tank associated with FIGS. 6A-6C, as can be reasonably assumed from the illustrated overall shape of material 600 inside of it, is again substantially cylindrical. However, the model of FIGS. 6A-6C differs from what was demonstrated in FIG. 5 at least in that two sensors 602 and 604 are deployed within the tank instead of just one. A two (or more) sensor variation will be preferable in some implementations due to differences, for example, in tank geometry and/or the particular shape taken on by material as it leaves the tank. The location of the point at which a tank is filled, as well as the location from which material exits the tank, can also impact the overall shape of the material in the tank at any given time. Predicted information in this category is another variable optionally incorporated into tank fill calculations. However, two sensors within the material will be also be enough in some cases to enable calculations of attributes of a shape to which material in the tank conforms before, during or after material is added or removed.

Sensors 602 and 604 are illustratively (though not necessarily) lily pad scales placed within material 600. Weight, downforce or other data collected by lily pad scale 604 illustratively enables a direct or indirect determination of material height away from the center of the tank within a hypothetical column 606. Weight, downforce or other data collected by lily pad scale 602 illustratively enables a direct or indirect determination of material height more toward the center of the tank within a second hypothetical column 608. Measurements from the material in column 608 enable a determination of the location of a peak of an inverse cone formed in the material. In one embodiment, data from these two sensors is combined by controller 402 with other variables to support programmatic calculation of tank fill. Of course, when this calculation is repeated dynamic determinations of tank fill over time or even rate of change are also enabled.

Thus, data from sensors 602 and 604 are examples of optional variables provided to the controller to support it programmatic tank fill calculations. In one example, measurements collected from sensor 602 in the context of FIGS. 6A-6C include a downforce measurement of 307.07262 N and a weight measurement of 31.302 kg. The measurements from sensor 604 are illustratively a downforce measurement of 308.07324 N and a weight measurement of 31.404 kg. Another optional value made available to support calculations is a radius of the sensor surfaces that define columns 606 and 608. In one example, this radius is 100 mm in both instances. Another optional value made available to support calculations is the surface area of the sensors. In one example, this is 31415.9265 mm2 in both instances. Another optional value made available to support calculations is a height 610 from each sensor to a bottom surface of the tank. In one example, this height is 600 mm. It should be noted though that the sensors need not necessarily be operated from the same height compared to one another. Another optional value made available to support calculations is a radius 612 or diameter of the actual tank. In one example, this radius is 1500 mm and the tank diameter is therefore 3000 mm. Another optional value made available to support calculations is the type of material in the tank. In one example, the material is wheat. Optional related values made available to support calculations are attributes of the density of the material in the tank. In one example, the material is wheat with an assumed density of 50.5 lbs./ft3 and 8.0901E-07 kg/mm3. Another optional made available to support calculations is an angle of repose relevant to the material in the tank. In one example, this is 25 degrees. Another optional value made available to support calculations is gravity, which is 9.81 m/s2. Another optional value made available to support calculations is an offset 613 between sensor 602 and sensor 604. In one example, this is 1000 mm. Another optional value made available to support calculations is a height 616 of column 608. In one example, this is 1247.169278583 mm. Another optional value made available to support calculations is a volume of column 608. In one example, this is 37715101.87 mm3. Another optional value made available to support calculations is a height 618 of column 606. In one example, this is 1235.609407 mm. Another optional value made available to support calculations is a volume of column 606. In one example, this is 38817814.37 mm3. Another optional value made available to support calculations is a volume of two empty imaginary cones including an inverse cone area 620 and an upright cone area 622. In one example, this is 976632.4754 mm3. Another optional value made available to support calculations is a volume of just area 622 or just area 620. In one example, this is 488316.2377 mm3. Another optional value made available to support calculations is a distance measured from the top edge of column 608 down to a peak of empty inverse cone area 620, which sticks into the column 608 itself. In one example, this is 46.63076582 mm. Another optional value made available to support calculations is a volume of the portion of the empty inverse cone area 620 that extends into column 608. In one example, this is 38691734.34 mm3. Another optional value made available to support calculations is a height of the imaginary cone area 622. In one example, this is 46.63076582 mm. Another optional value made available to support calculations is a height 617 of column 608 measured just to a peak of the empty inverse cone area 620. In one embodiment, this is 1200.5385127675 mm. Another optional measurement made available to support calculations is a height 624 measured from sensor level to a transition level 626. In one embodiment, this is 1000.5385127675 mm. Another optional value made available to support calculations is a radius of imaginary cone areas 620 and 622. In one example, this is 537.6365565 mm. Another optional value made available to support calculations is a height 630 from a peak of imaginary inverse cone area 620 to a peak of imaginary cone area 622. Another optional value made available to support calculations is a height 632 from a bottom of the tank to a peak of imaginary cone area 622. Another optional value made available to support calculations is a height 634 from the transition level 626 to a base of inverse cone are 620.

Even with the numerous examples of optional values made available for calculations. There are still others. For example, changes in height are illustratively usable instead of or in addition to actual height values. Measures of dispensed product, for example in terms of volume or mass, are also usable. Of course, the full volume and mass of the tank itself are also optionally available calculation variables. Measures of product added, for example in terms of volume or mass, are also usable.

Not all sensors providing variables made available for tank fill calculations need necessarily be embedded within the material inside the tank. A combination is also possible. FIG. 7 is another example wherein data is contributed by sensors 702 and 704 embedded within material 700, in manner that has already been described. However, FIG. 7 also includes a proximity sensor 706 that makes available for the tank fill calculations a different category of sensed tank content information. In one example, sensor 706 is a contact sensor, such as a mechanical contact sensor that detects when material is at least at a level proximate to the sensor itself. Such a sensor may can include a movable element that goes into motion when it comes into (or out of) contact with tank material, thereby triggering a response in one form or another from a tied in sensor element. This is just one example and any number of these or other sensors may be deployed.

FIG. 8 is another example wherein data is contributed by sensors 802 and 804 embedded within material 800, in manner that has already been described. In this case, a non-contact sensor 806 such as an ultrasonic sensor is deployed in order to collect data related to a location of a surface of material 800. One contactless sensor is shown but of course any number and position within the tank is possible. Data is illustratively collected from contact or contactless sensors is optionally combined with sensors within the material to inform programmatic tank fill calculations made, for example, by a controller similar to controller 402 described herein.

Thus, one or more sensors within the material are illustratively combinable with one or more other types of sensors. In one example, the other sensor or sensors are configured to identify one or more characteristics of the cone or other shape(s) assumed by an upper surface of the material. The collection of shape data can occur before, during or after material is added or subtracted to the tank. Data from these secondary sensors is optionally provided as another variable for supporting calculations of tank fill, etc. In one example, the other sensor or sensors is used to detect the material at its surface in a single location. In another example, the other sensor or sensors is used to detect the material at its surface in multiple locations. In one example, the other sensor or sensors is a camera, such as but not limited to a two-dimensional multiple point camera with integrated autofocus functionality.

Figure 9:
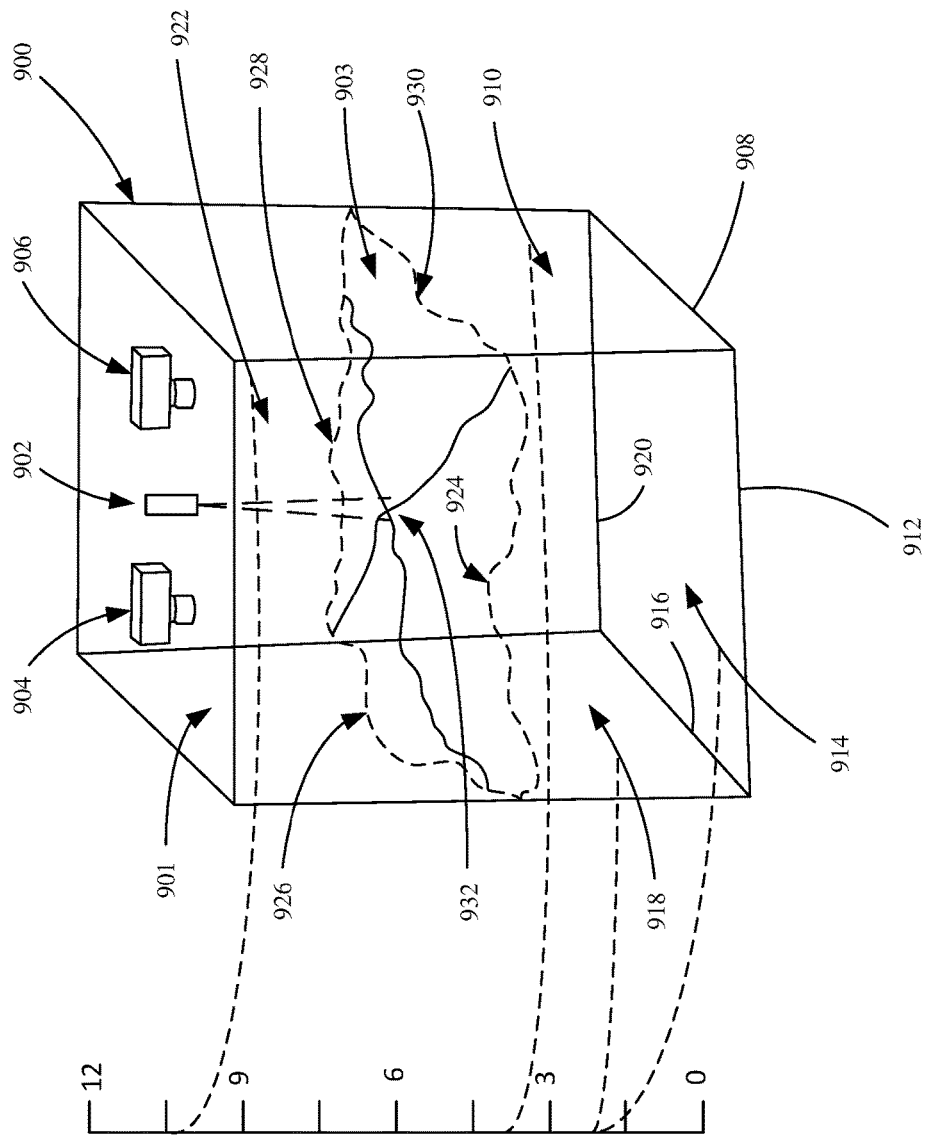
FIG. 9 is a schematic perspective view of material inside another hypothetical tank.

In one example, the sensing of material from an up above position in a tank is more sophisticated. FIG. 9 is a schematic perspective view of material 903 inside another hypothetical tank 900. Tank 900 is shown to be cubic for example purposes only. Further, the walls of the tank are assumed to be transparent simply for illustrative purposes so that material within tank 900 can be more easily conceptualized. In reality, the tank walls are unlikely to be transparent.

An ultrasonic sensor 902 is mounted at or near a topside 901 of tank 900. Nearby is are mounted a first camera 904 and a second camera 906. The cameras are deployed such that each has a view of one or more linear reference scales presented on inner walls of tank 900. Though this can be any number of scales, four scales will be assumed. This includes a scale 910 on a right side of tank 900. It also includes a scale 914 on a front side 912 of tank 900. It also includes a scale 918 on a left side 916 of tank 900. Finally, it includes a scale 922 on a rear side 920 of tank 900.

Controller 402 illustratively receives data from any or all of sensors 902, 904 and 906. The controller 402 is then configured to incorporate some or all of the data into tank material quantity calculations. This data received from sensors 902, 904, and/or 906 is incorporated into the calculations in addition to or instead of any other variables or sensor data described elsewhere in this description. For example, calculations are illustratively computable in combination with data from one or more sensors placed in a lower position in the tank, including within the material (e.g., one or more lily pad sensors).

In general terms, the purpose of FIG. 9 is to demonstrate use of a combination of "stereo" cameras, linear reference scales, image processing methods, and an ultrasonic sensor to equip controller 402 to programmatically determine measurements for tank fill and quantity. In particular, controller 402 illustratively includes image processing functionality that enables it to extract tank fill variables or data points from images captured by cameras 904 and/or 906. For example, controller 402 is illustratively configured to extract from the image data at least one indicator of tank fill proximate to right side 908 by comparing it to scale 910 in the same image. Similar data points can be collected from one or both cameras in order to ascertain a material level proximate sides 912, 916 and 920 in relation to their respective scales 914, 918, and 922. A signal from an ultrasonic sensor 902 illustratively then equips controller 402 with a measurement of a level of the material 903 at a more intermediate or even central location. Of course, it should be understood that a different device for collecting intermediate data or information could just as easily be utilized in addition to or instead of an ultrasonic sensor. Similarly, devices other than or in addition to camera could just as easy be deployed. The particular devices provided should be considered only examples. Regardless of the particular device configuration, any or all of the data points are derived or accessed by controller 402 and factored into tank fill and/or quantity calculations.

Figure 10:
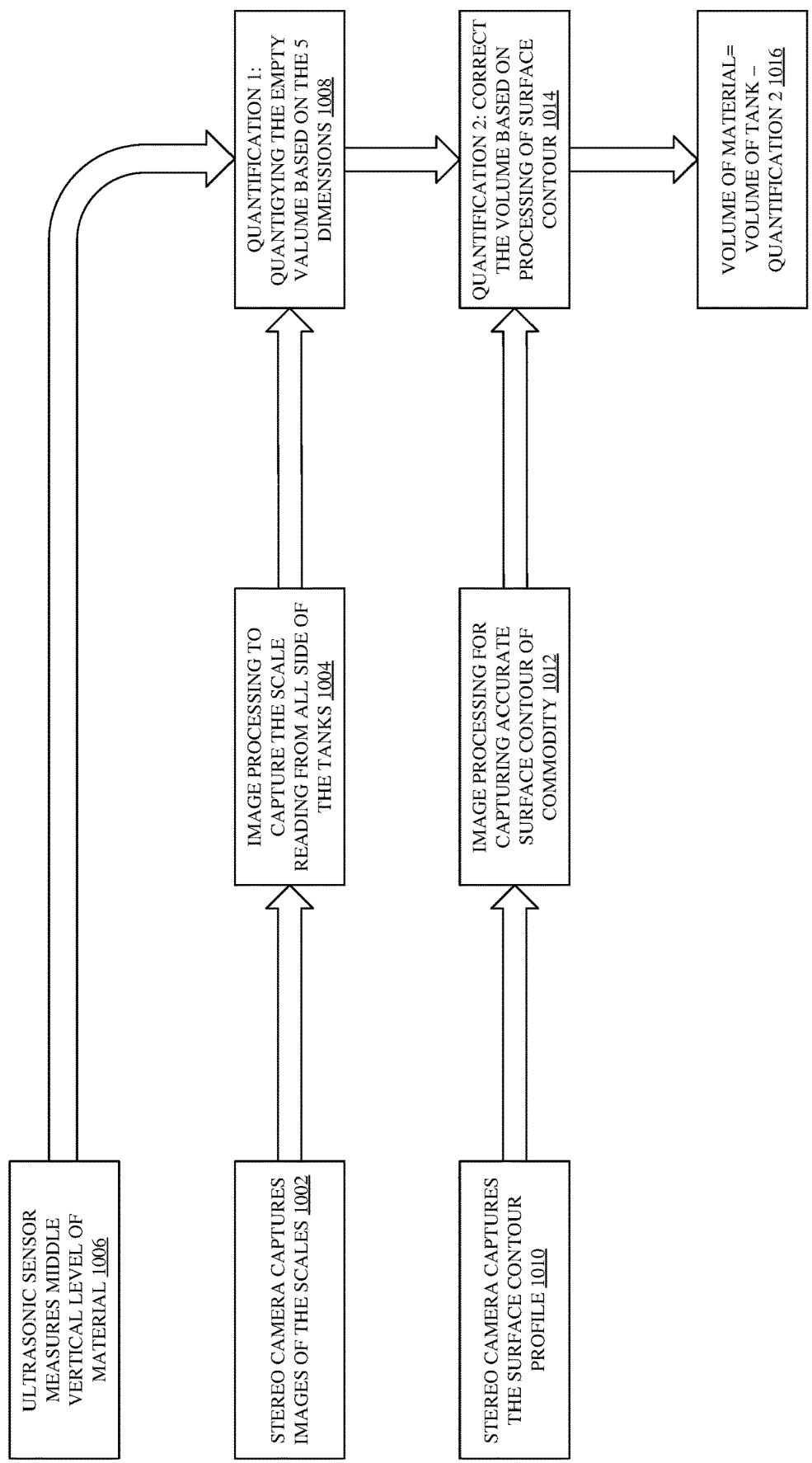
FIG. 10 is a flow chart representation of steps for determining tank fill.

FIG. 10 is a flow chart representation of an example of steps that are programmatically carried out by controller 402 in order to determine a volume of material 903 in tank 900. In accordance with block 1002, cameras 904 and 906 capture images of where scales 910, 914, 918, and 922 extend above material 903. Thus, the cameras capture an indicator of a dimension 924, 926, 928 and 930 of tank along each of sides 908, 912, 916 and 920 of tank 900. In accordance with block 1004, image processing is applied by controller 402 to the captured images in order to extract the scale readings in a form that makes them appropriate to operate as variables in tank fill and quantity calculations subsequently made by the controller. In accordance with block 1006, a fifth dimension 932 is captured by ultrasonic sensor 902. Controller receives this data as an indicator of a vertical level of material 903 more toward a center of tank 900. In accordance with a block 1008, controller 402 is configured to programmatically use data points or dimensions 924, 926, 928, 930 and 932 as a basis of a first quantification of the empty portion of tank 900. In accordance with a block 1010, cameras 904 and 906 also operate together to capture a surface contour profile of material 903. In accordance with block 1012, image processing is applied by controller 402 to the captured contour profile image in order to extract measurable details appropriate to operate as variables in tank fill and quantity calculations subsequently made by the controller. In accordance with block 1014, controller 402 is configured to programmatically correct the first quantification of step 1008 based on, for example, the data derived related to the details of the contour of the top surface of material 903. Finally, in accordance with block 1016, the controller 402 is then configured to identify one or more aspects of tank fill by subtracting a determined empty tank volume from a total volume of tank 900. This is just one example of how a controller can be configured to support a tank fill calculation.

Figure 11:
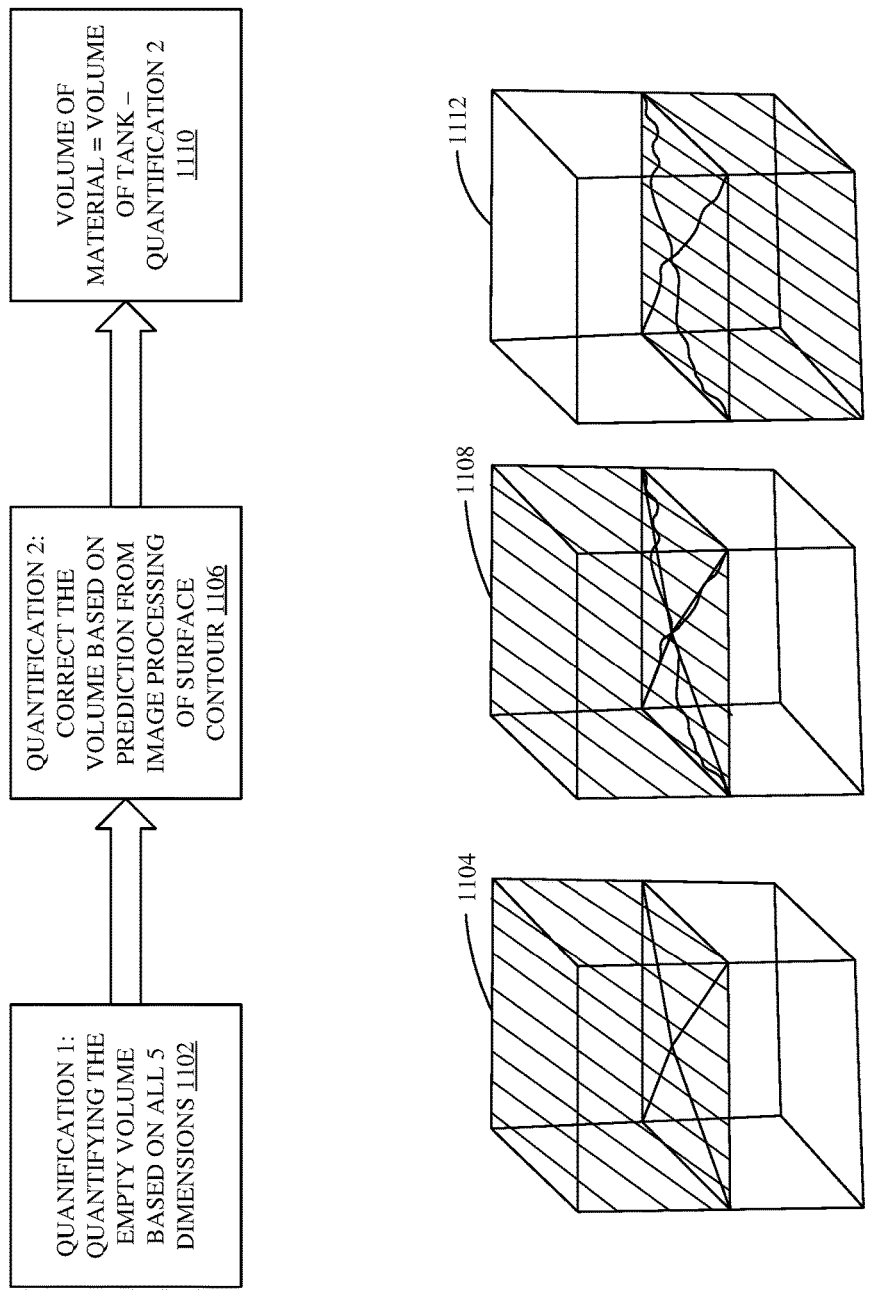
FIG. 11 is a simplified, illustrated schematic process diagram providing a different example conceptualization of the steps similar to those described in relation to FIG. 10.

FIG. 11 is a simplified, illustrated schematic process diagram providing a different example conceptualization of the steps similar to those described in relation to FIG. 10. Block 1102 and tank diagram 1104 together represent the first quantification, which is illustratively a calculation of an upper empty tank portion (i.e., the hatched portion of tank diagram 1104). This first quantification is, for example, is calculated by controller 402 based on the four side and one center measurements facilitated by the cameras and ultrasonic sensor. Block 1106 and tank diagram 1108 together represent the second quantification, which is illustratively a correction of the first quantification to account for a complex rather than contoured surface of material in the tank. Block 1110 and tank diagram 1112 together represent a final calculation of a volume of material in a lower filled tank portion (i.e., the hatched portion of tank diagram 1112). Due to the calculation of the empty portion of the tank, a filled portion is, for example, calculated by controller 402 as a total tank volume minus the empty tank volume.

It should be emphasized that controller 402 is optionally programmed for tank fill calculations that include variables or inputs other than simply measurements taken from sensors. An example of this is information about tank geometry, tank shape, tank measurements, tank fill location and/or any other "fixed" variables. This data is illustratively provided as manual inputs through a user interface to the controller 402 to support its programmatic tank fill calculations. Of course, this does not necessarily mean that every data point is specifically and directly entered. For example, a user might simply provide a tank or other equipment identifier, which triggers an automated retrieval of related from a local or remote data store. Material type and characteristics are another example of data that is illustratively directly input into a user interface and supplied to the controller 402 to support its calculations. Again, this could also involve manual input of a limited amount of information that triggers a retrieval of more detailed related data points.

The programmatic logic of controller 402 need not be limited to volume calculations. In a specific example, the logic of controller 402 is configured to facilitate determinations related to mass and/or material density. For example, the mass of material in a tank (e.g., in pounds) is illustratively calculated as the volume (e.g., in cubic inches) multiplied by the density (e.g., in pounds per cubic inch). Accordingly, based on a determined volume measurement, controller 402 illustratively determines a mass of material in the tank. Just as the level of material inside the tank varies, so too is the density of material in the tank likely to vary, especially when the tank is filled with a granular material (which will not necessarily be the case). For example, with a completely filled tank, density is likely to be higher due to a greater compactness. As the tank is gradually emptied, density will be less due to a lesser degree of compactness.

Thus, it is conceived that the programmatic logic of controller 402 be configured to correct for any variation likely to change over time, but especially in density. For example, a density correction factor is illustratively incorporated into tank fill and other calculation logic of controller 402 and can even customized based on the type of material in the tank. In other words, the density correction factor is illustratively varied intentionally at least based on commodity type and tank fill level. This is another reason for controller 402 to be configured to accept direct or indirect indicators of circumstantial variables and or pre-sets.

In a more specific example, suppose a measured density for a commodity (e.g., a particular type of seed) is assumed equal to a variable x. In one embodiment, the logic of controller 402 is programmed to assume a density of 1.05 times x when the level of material in the tank is in a high range. When the level is in a mid-range, the density is illustratively assumed to be x. And when the level is in a low range, the density factor is assumed to be 0.98x. These values are only examples. Any other variables and schemes that enable the logic of controller 402 to correct for density variation at different tank levels are possible. Of course, based on the ultrasonic sensor 902, in one example, the controller 402 can be programmed with an awareness of a current level in order to support variation in density assumptions. This is just one example of a tank level input for supporting the variation in density assumptions. Traditional paddle sensors, one or both of cameras 904 and 906 or any other device or scheme could just as easily be utilized. One or more of the lily pad sensors described in relation to other Figures is also another alternative. But at the end of the day, a final mass can be calculated through the programmatic logic of the controller 402 by multiplying a measured volume of material by a measured density and then accounting for a density correction factor based, for example, on tank fill level.

The schemes described here for tracking tank fill attributes are advantageous in a variety of different ways. For example, they are more accurate than man current approaches such as basic tank level sensors. They also provide less expensive alternatives to some current approaches, which enables integration into a spectrum of products on a broader cost scale. They also enable measurement even when seeding machinery is being actively operated. The machinery need not necessarily be stopped to enable accuracy. Further, no major changes need be made to most existing equipment in order to support retroactive integration. Thus, it is possible for the technology to be offered as an aftermarket option. Still further, meter calibration can be done in most cases from the cab and can even be a dynamic event.

Finally, it should be mentioned that the concepts described herein are not necessarily limited to application in the context of any particular seeder type agricultural equipment such as those described herein. Any type of seeder is a possibility. In one example, a sensor configuration as described herein is retrofit to an existing seeder that may or may not already have other tank fill feedback functionality. Neither are the concepts described herein even limited to seeder type agricultural equipment. Implementations could just as easily be deployed in the context of a planter, fertilizer system, row unit hoppers, nutrient applicators and really any other piece of equipment that includes a tank or other storage component where material for dispersion is stored.

The tank monitoring system examples described herein have referenced a controller configured to perform calculations. Of course, a such a controller is likely to be part of a broader computing system that includes, for example, one or more processors and optionally one or more servers. In one embodiment, the processors and servers include computer processors with associated memory and timing circuitry. They are illustratively functional parts of the systems or devices to which they belong and are activated by, and facilitate the functionality of the other components or items in those systems.

Information directly or indirectly related to the tank monitoring systems described herein is also illustratively presented on any number of user interface displays. The displays can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

Information directly or indirectly related to the tank monitoring systems described herein is likely to be stored in one or more data stores that, optionally, can even be broken into multiple data stores. All can be local to the systems accessing them, all can be remote, or some can be local while others are remote. All of these configurations are contemplated herein.

Figure 12:
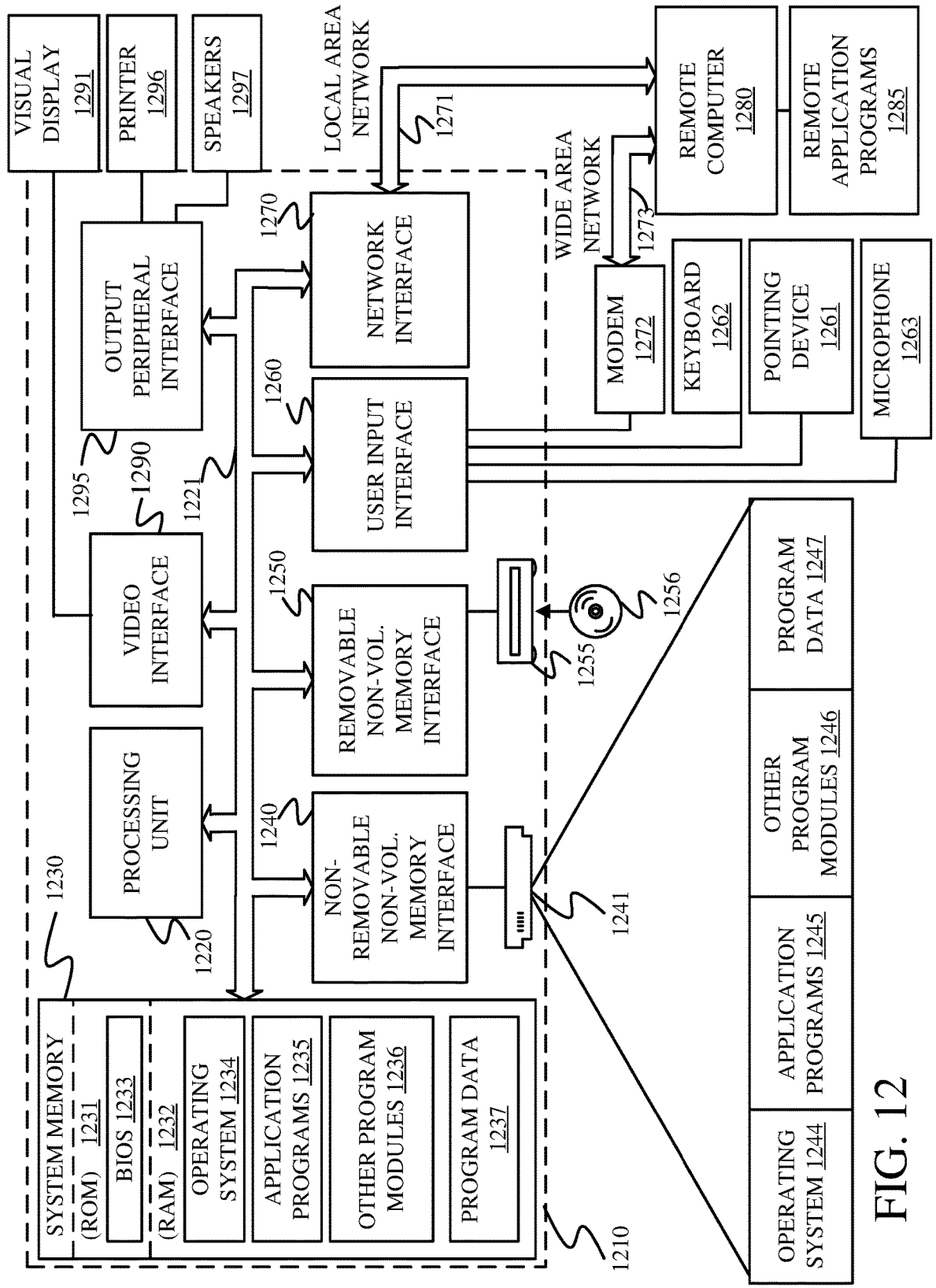
FIG. 12 is one embodiment of a computing environment.

FIG. 12 is one embodiment of a computing environment in which elements (e.g., controller 402) of the configurations described herein, or parts of them, can be deployed. With reference to FIG. 12, an exemplary system for implementing some embodiments includes a general-purpose computing device in the form of a computer 1210. Components of computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect the Figures herein can be deployed in corresponding portions of FIG. 12.

Computer 1210 typically includes a variety of computer readable media. Computer readable media can be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory such as read only memory (ROM) 1231 and random-access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable volatile/nonvolatile computer storage media. By way of example only, FIG. 12 illustrates a hard disk drive 1241 that reads from or writes to non-removable, nonvolatile magnetic media, a magnetic disk drive 1251, nonvolatile magnetic disk 1252, an optical disk drive 1255, and nonvolatile optical disk 1256. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 12 illustrates, for example, that remote application programs 1285 can reside on remote computer 1280.

It should also be noted that the different embodiments described herein can be combined in different ways. That is, parts of one or more embodiments can be combined with parts of one or more other embodiments. All of this is contemplated herein. Also, the figures show a number of blocks with functionality ascribed to each block. It will be noted that fewer blocks can be used so the functionality is performed by fewer components. Also, more blocks can be used with the functionality distributed among more components.

One example of an embodiment is a system for determining an indication of a volume of a material in a tank of an air seeder commodity cart. A sensor is positioned in the tank such that it is under the material when the tank is full. The sensor is configured to detect an attribute of a limited amount of the material above the sensor. The sensor also generates an output signal indicative of the attribute of the limited amount of material above the sensor. A controller receives the output signal and incorporates a corresponding variable into a programmatic calculation of the indication of the volume of the material in the tank.

In one embodiment of the system, the variable indicative of the output signal is an indicator of force applied on at least a portion of the sensor by the limited amount of the material. In another embodiment, the variable indicative of the output signal is an indicator of weight applied on at least a portion of the sensor by the limited amount of the material. In another embodiment, the system includes at least one additional sensor positioned so as to detect an attribute of a surface of the material, the additional sensor generating an output signal indicative of the attribute of the surface of the material. The controller receives the attribute of the surface of the material and incorporates it as a second variable in the programmatic calculation. In another embodiment, the attribute of the surface of the material is an indication of a shape of the surface. In another embodiment, the additional sensor is a sensor that determines the attribute of the surface of the material through detection in more than one location on the surface of the material. In another embodiment, the additional sensor is a sensor that facilitates determination of the attribute of the surface of the material by capturing an image of where an edge of the material is in relation to a scale. In another embodiment, the additional sensor is a camera.

Another example of an embodiment is a controller that receives an output signal indicative of an attribute of a limited amount of material above a sensor. The controller incorporates a variable that corresponds to the attribute of the limited amount of material above the sensor into a programmatic calculation of an indication of a volume of material in a tank.

In one embodiment, the controller receives an output signal indicative of an attribute of a surface of the material and incorporates a variable that corresponds to the attribute of the surface into the programmatic calculation. In another embodiment, the attribute of the surface of the material is indicative of a shape of the surface of the material. In another embodiment, the attribute of the surface of the material is indicative of a level of material in the tank. In another embodiment, the attribute of the surface of the material is derived from an application of image processing to an image of the surface of the material. In another embodiment, the controller incorporates a tank measurement into the programmatic calculation. In another embodiment, the controller incorporates a measurement of a conceptual shape of material into the programmatic calculation.

Another example of an embodiment is a method of measuring a quantity of material in a tank of an agricultural machine. The method includes receiving an output from a first sensor, the output from the first sensor including an indication of an attribute of the material from a perspective beneath a surface of the material. The method also includes receiving an output from a second sensor, the output from the second sensor including an indication of an attribute of the material from a second perspective above a surface of the material. The method also includes receiving the output signals from the first and second sensors and incorporating corresponding variables into a programmatic calculation of an indication of the quantity of material in the container.

In one embodiment of the method, the output from the second sensor is information to which processing is applied in order to derive the corresponding variable. In another embodiment, the output from the second sensor is an image to which processing is applied in order to identify at what location an edge of the material meets a scale, the corresponding variable representing the location. In another embodiment, the second sensor is one of a camera or ultrasound device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An air seeder comprising:
   a tank configured to hold material;
   a sensor disposed in the tank such that the sensor will be under the material when the tank is full, the sensor being configured to detect an attribute of a limited amount of material above the sensor and to generate an output signal indicative of the attribute of the limited amount of material above the sensor; and
   a controller configured to receive the output signal indicative of the attribute of the limited amount of material above the sensor and to incorporate a variable that corresponds to, the attribute of the limited amount of material above the sensor into a programmatic calculation of an indication of a volume of material left in the tank.

2. The air seeder of claim 1, wherein the controller is configured to receive an output signal indicative of an attribute of a surface of the material and to incorporate a variable that corresponds to the attribute of the surface of the material into the programmatic calculation.

3. The air seeder of claim 2, wherein the attribute of the surface of the material is indicative of a shape of the surface of the material.

4. The air seeder of claim 2, wherein the attribute of the surface of the material is indicative of a level of material in the tank.

5. The air seeder of claim 2, wherein the attribute of the surface of the material is derived from an application of image processing to an image of the material.

6. The air seeder of claim 2, wherein the controller incorporates a tank measurement into the programmatic calculation.

7. The air seeder of claim 2, wherein the controller incorporates a measurement of a conceptual shape of material into the programmatic calculation.

* * * * *